April 29, 1969 R. L. PRINCE 3,440,758
CRAB TRAP
Filed Sept. 5, 1967
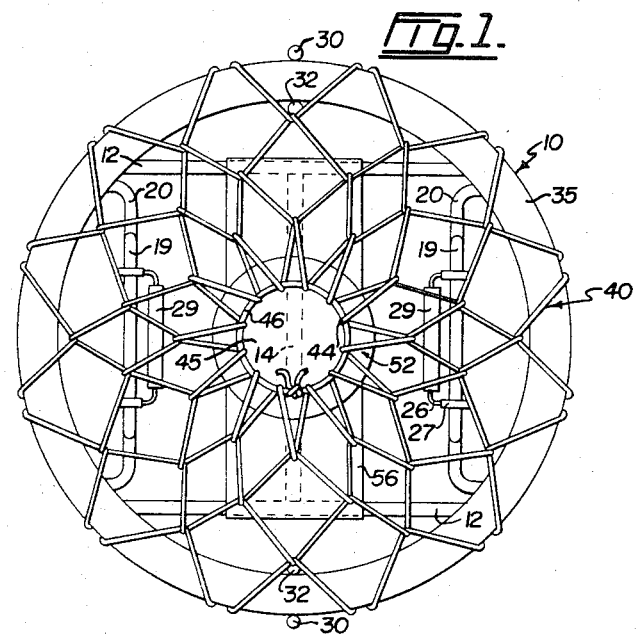
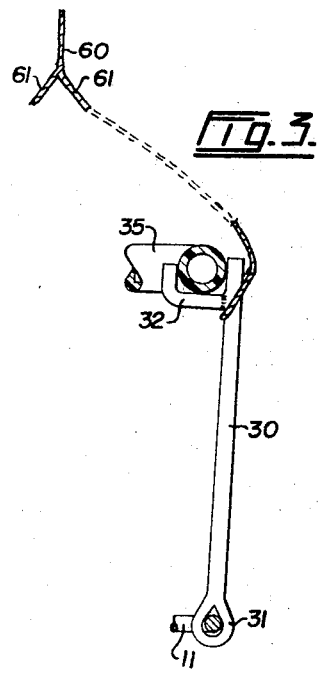
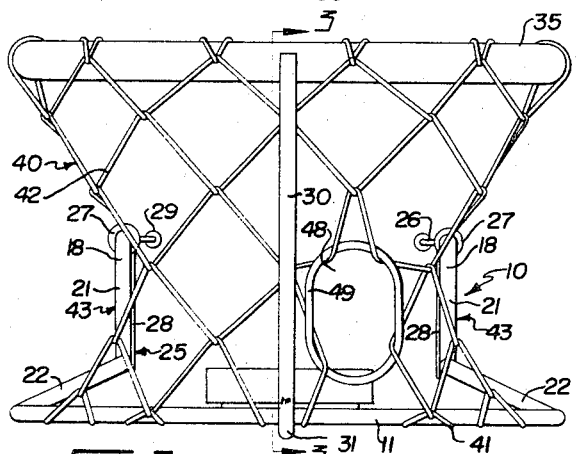
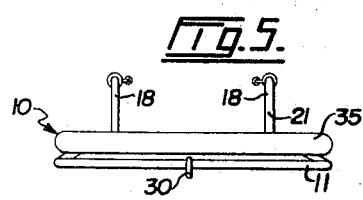
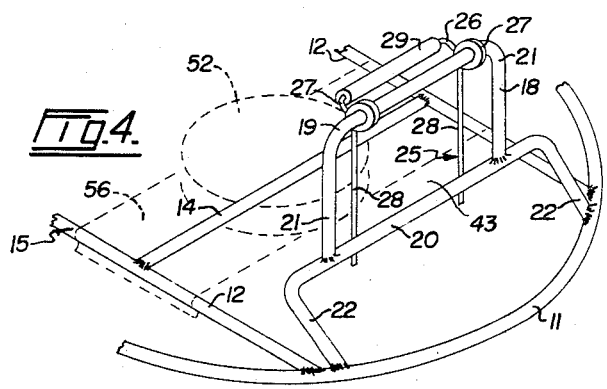
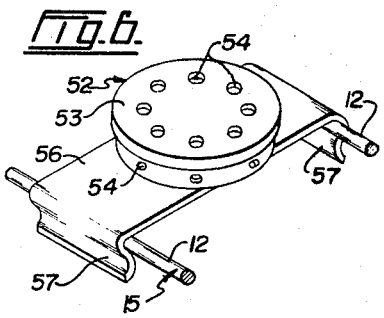
INVENTOR
ROLAND L. PRINCE
BY
Fetherstonhaugh & Co.
ATTORNEYS

3,440,758
CRAB TRAP
Roland L. Prince, 1730 Ash Road, Victoria,
British Columbia, Canada
Filed Sept. 5, 1967, Ser. No. 665,390
Int. Cl. A01k 69/10
U.S. Cl. 43—100                                    10 Claims

ABSTRACT OF THE DISCLOSURE

A trap having a collapsible frame and a purse net enclosing the frame with the frame and net being mutually supporting when the trap is erected to a position of use. The frame includes an upper buoyant ring, a lower ring, and supports pivoted on the lower ring and having forked upper ends releasably engaging the upper ring. The net includes a bottom wall and a tubular side wall which extends above the upper ring and a drawstring is provided adjacent its upper edge for tensioning the net against the frame.

Background of the invention

This invention relates to a fishing trap which can be used to catch lobsters and shrimp but which is particularly intended for use in catching crabs.

Because crab traps take up so much space aboard a fish boat, many attempts have been made to design a trap which can be folded in some way for purposes of storage both on the boat and ashore. Some of these structures are quite readily collapsed and re-erected but the traps are objected to by fishermen for such reasons as their excessive weight, a tendency to collapse or at least partially collapse when they are resting on the ocean floor so that they cannot fish effectively, and the need for lowering the traps by means of a handline into position of use so that they remain upright with their entrances unobstructed.

Summary of the invention

The present invention overcomes the above and other disadvantages of conventional traps by providing a lightweight and collapsible frame of extremely simple design which will give the required shape to a bag-like net with the net, in turn, supporting the frame against collapse. The upper part of the trap is made buoyant to ensure proper positioning of the trap on the ocean floor and the trap entrance is rigidly supported from a relatively heavy lower part so that the entrance cannot become distorted and therefore blocked. A counterweighted gate extends across the entrance to provide easy access to the interior of the trap and to effectively bar exit therefrom.

Brief description of the drawing

FIGURE 1 is a plan of the crab trap,

FIGURE 2 is a side elevation,

FIGURE 3 is a fragmentary section taken on the line 3—3 of FIGURE 2.

FIGURE 4 is a fragmentary perspective view of the bottom frame member and showing the construction of an entrance frame and adjoining parts, FIGURE 5 is a reduced scale view of the folded trap minus the net, and FIGURE 6 is a perspective view of the bait box.

Description of the preferred embodiment

Referring to the drawings, the trap will be seen to comprise a collapsible frame indicated generally by the numeral 10. Frame 10 includes a bottom ring 11 formed of lightweight metal rod which is reinforced by cross braces 12 and 14, the braces providing the trap with a rigid and open floor 15.

On opposite sides of the bottom ring 11, rectangular entrance frames 18 are provided, see particularly FIGURE 4. The entrance frames preferably are formed of the same size metal rod as the ring 11, the entrance frame parts and the bottom ring being welded together to form a rigid base structure for the trap. Entrance frames 18 are provided with upper bars 19, lower bars 20, and side bars 21. Bars 20 extend beyond the vertically disposed side bars 21 and are bent to provide downwardly and outwardly turned legs 22 which are disposed at an acute angle to the floor 15. Thus, the entrance frames 18 are supported by the legs 22, a short distance above the floor 15, in a vertical position, and spaced inwardly of the ring 11.

Mounted on the bar 19 of each entrance frame 18, is a gate generally indicated at 25. Each gate 25 is formed of a length of stiff wire which is bent substantially into an inverted U-shape to provide the gate with a cross member 26, a pair of hinges 27 which encircle the bar 19, and parallel arms 28 which extend downwardly past the lower bar 20. The arms 28 of each gate are vertically disposed when they engage the adjacent bar 20 and, at this time, the member 26 is substantially horizontal. A counterweight 29 is fitted to each member 26 so as to swing the arms 28 towards the adjacent lower bar 20, which then serves as a stop to prevent the gate 25 from swinging outwardly beyond the normally closed position shown best in FIGURE 4.

Fitted to the bottom ring 11, is a pair of diametrically opposed supports 30, see detail in FIGURE 3. Each support 30 has an eye 31 which encircles the ring 11 so that said support is hingedly mounted on this lower part of the frame 10. The opposite end of each support 30 has a laterally projecting fork 32.

Frame 10 has a tubular top ring 35, this ring preferably being formed of a fairly stiff plastic which is sufficiently light in weight so that the top ring is buoyant in water. When the supports 30 are in the upright position, see particularly FIGURE 3, the top ring 35 is received in the forks 32, the several parts being secured together as a unit by means of a purse net which is generally indicated by the numeral 40.

Net 40 is formed somewhat like a bag, that is to say, it has a bottom wall 41 which extends beneath the floor 15 and a substantially cylindrical side wall 42 which projects above the top ring 35. Side wall 42 has entrance openings 43 which register with the entrance frames 18. The net 40 has an upper edge 44 which provides the trap with a discharge opening 45. A drawcord 46 is fitted to the edge 44 of the purse net, see FIGURE 1.

The bottom ring 11 and top ring 35 are secured to the net 40, preferably by passing the cords of the mesh net around the rings so that these top and bottom members of the frame normally are rather loosely tied together. The net is also secured to the entrance frames 18, the side edges of the openings 43 being woven around the frames or otherwise secured thereto. When the two rings are pulled apart and the supports 30 are swung upright, it will be found that the top member 35 will just clear the forks 32 while the side wall 42 of the net is subjected to slight tension. The ring 35 can then be lodged in the forks 32 and be retained therein by the lesser amount of tension which remains in the net.

When the drawcord 46 is tightened and tied, the discharge opening 45 is closed and the net 40 is appropriately tensioned. This tensioning of the net 40 clamps the top ring 35 within the forks 32 and applied sufficient pressure to the supports 30 so that they cannot swing away from their normally vertically disposed positions. Thus, the rings 11 and 35 are secured together by the net 40 and are held in properly spaced relation by means of the vertical supports 30.

The mesh of the net 40 would, of course, vary in size according to the species of crustacean the trap was designed to catch. For example, a lobster or crab trap could have quite a large mesh net while a shrimp trap would necessarily have a relatively fine mesh net. In each case, the cylindrical side wall 42 of the purse net is provided with an escape opening 48 which is bordered by a metal ring 49, the opening being located a few inches or so above the floor 15. The diameter of the opening 48 is such that a crustacean below the size which can be taken legally could escape from the trap.

It will be noted that, when the net 40 is tensioned as above described, the net is drawn taut around the side openings 43 and the escape opening 48. Thus, the net cannot sag so as to obstruct the openings and interfere with the effective operation of the trap. Since the entrance frames 18 are rigidly supported by the bottom ring 11, and the net 40 is taut when the trap is in fishing position, there is no danger of the gates 25 becoming fouled and failing to operate in their intended manner.

Mounted on the floor 15 of the trap is a bait box 52 which preferably is formed of a suitable clear plastic material. Box 52 is fitted with a screw top lid 53 and both the box and the lid are provided with suitably spaced vents 54. The box is secured to the centre of a plastic base strip 56 and the ends of this strip are provided with resilient clips 57. The spacing between the clips 57 is such that said clips can be snapped over the cross braces 12 so that the brace 14 bears against the underside of the strip 56 and the bait box is securely attached to the frame 10.

The crab trap is adapted to be raised and lowered in the water by means of an anchor rope 60, shown in FIGURE 3 only, the rope being provided with branches 61 at its lower end. The branches 61 are suitably secured to a part of the frame 10, preferably to the supports 30 as shown in FIGURE 3.

In use, the crab trap is baited by placing bait within the box 52 and is thrown overboard from the fishboat with a suitable marker buoy attached to the upper end of the rope 60. The trap descends in the water in an upright position due to the buoyant action of the top ring 35 and the greater weight of the bottom ring 11. The trap settles on the ocean floor in this upright position and is ready to operate without adjustment of its position or parts by the fisherman. A crab or the like, sensing the bait within the box 52, can easily push open a gate 25 to crawl into the trap in an attempt to reach the bait whereupon said gate is swung shut by the action of the counterweight 29 and cannot readily be reopened. When the loaded trap is raised by the fisherman, he merely has to untie the drawcord 46 to open the discharge opening 45 and then invert the trap to drop the snared crabs into another container. It is then a simple matter to right the inverted trap and reclose the discharge opening whereupon the trap again is ready for use. Since the box 52 effectively prevents the trapped crabs from reaching the bait, the trap is not required to be baited as often as a conventional trap.

When fishing is over and the trap is required to be collapsed for storage on the boat or elsewhere, the fisherman again unties the drawcord 46 and opens the discharge openings 45. This takes the tension off the purse net 40 so that the top ring 35 can be raised slightly to clear the forks 32. The supports 30 are then swung out and down into contact with the underside of the floor 15 which allows the top ring 35 to be lowered into contact with the bottom ring 11. At this time, the entrance frames 18 project upwardly through the top ring 35, and the collapsed frame 10 then forms a reasonably compact bundle as shown in FIGURE 5. A number of the crab traps can then be piled one on top of another so as to occupy only a relatively small space aboard the fish boat.

From the foregoing, it will be apparent that an extremely simple and effective trap has been provided which can readily be folded when no longer required for fishing.

I claim:

1. A crab trap comprising a collapsible frame including an open bottom member, an open top member, and displaceable side supports; a purse net enclosing the frame and having a bottom wall and a tubular side wall in which a side entrance opening is formed, said side wall having an upper edge extending above the top member to provide a discharge opening, a drawcord fitted to the upper edge of the side wall adjacent the discharge opening, said drawcord being adapted to be tightened to close the discharge opening and apply tension to the net to support the frame against collapse.

2. A crab trap as claimed in claim 1, and including an entrance frame rigidly supported by one of said frame members in a substantially vertical position intermediate the height of the collapsible frame and in register with the side entrance opening in the tubular wall of the purse net.

3. A crab trap as claimed in claim 2, and including a gate hingedly mounted on the entrance frame to swing by gravity to normally closed position, said entrance frame having a lower bar engageable by the gate to prevent said gate from swinging outwardly beyond the tubular side wall of the net.

4. A crab trap as claimed in claim 3, and including a counterweight mounted on the gate to urge said gate to normally closed position.

5. A crab trap as claimed in claim 2, in which said bottom member of the frame is a stiff ring connected by cross braces to provide an open floor for the collapsible trap.

6. A crab trap as claimed in claim 3, in which said top member of the collapsible frame is a buoyant ring.

7. A crab trap as claimed in claim 1, and including a vented bait box supported by the collapsible frame.

8. A crab trap comprising a collapsible frame including a bottom ring, a top ring and side supports, said side supports being swingingly mounted at one end on the bottom ring and having forks at the opposite end in which the top ring is received, an entrance frame rigidly supported by the bottom ring in a substantially vertical position adjacent said bottom ring, said entrance frame having an upper bar and a lower bar, a gate hingedly mounted on the upper bar for swinging movement into contact with the lower bar, a purse net enclosing the frame and having a tubular side wall, said tubular side wall having an entrance opening the side edges of which are secured to the entrance frame, said tubular side wall having an upper edge projecting above the top ring to provide a discharge opening, a drawcord fitted to the upper edge adjacent the discharge opening, said drawcord, when tightened to close the discharge opening, tensioning the net to lock the top ring within the forks of the side supports.

9. A crab trap as claimed in claim 8 in which the top ring is buoyant.

10. A crab trap as claimed in claim 8, and including a vented bait box having a base strip, said base strip being provided with spring clips at each end thereof, said bottom ring having cross braces, and said spring clips being attachable to the cross braces to releasably secure the bait box to the trap.

References Cited

UNITED STATES PATENTS

| | | | |
|---|---|---|---|
| 2,716,304 | 8/1955 | Taylor | 43—100 |
| 3,029,546 | 4/1962 | Ruiz | 43—105 |

WARNER H. CAMP, *Primary Examiner.*